(12) United States Patent
Thom et al.

(10) Patent No.: US 11,969,688 B2
(45) Date of Patent: Apr. 30, 2024

(54) FILTRATION DEVICE, METHOD FOR ASSEMBLING A MODULAR FILTRATION DEVICE, AND METHOD FOR CHARACTERIZING A FILTER MEDIUM AND/OR A MEDIUM TO BE FILTERED

(71) Applicant: Sartorius Stedim Biotech GmbH, Göttingen (DE)

(72) Inventors: Volkmar Thom, Göttingen (DE); Björn Hansmann, Göttingen (DE); Magnus Warnke, Bovenden (DE); Peter Kosiol, Göttingen (DE)

(73) Assignee: Sartorius Stedim Biotech GmbH (DE)

( * ) Notice: Subject to any disclaimer, the term of this patent is extended or adjusted under 35 U.S.C. 154(b) by 1077 days.

(21) Appl. No.: 16/649,614

(22) PCT Filed: Sep. 20, 2018

(86) PCT No.: PCT/EP2018/075413
§ 371 (c)(1),
(2) Date: Mar. 20, 2020

(87) PCT Pub. No.: WO2019/063394
PCT Pub. Date: Apr. 4, 2019

(65) Prior Publication Data
US 2020/0269178 A1    Aug. 27, 2020

(30) Foreign Application Priority Data
Sep. 29, 2017    (DE) .................... 10 2017 009 147.1

(51) Int. Cl.
*B01L 3/00*    (2006.01)
*B01D 24/00*    (2006.01)
(Continued)

(52) U.S. Cl.
CPC ......... *B01D 46/442* (2013.01); *B01D 24/002* (2013.01); *B01D 46/58* (2022.01);
(Continued)

(58) Field of Classification Search
CPC .... B01D 46/442; B01D 24/002; B01D 46/58; B01D 2221/10; B01D 2313/06;
(Continued)

(56) References Cited

U.S. PATENT DOCUMENTS

| | | |
|---|---|---|
| 2006/0088448 A1 | 4/2006 | Massaro et al. |
| 2009/0071834 A1 | 3/2009 | Hafeman et al. |
| 2016/0023210 A1 | 1/2016 | Birkner et al. |

FOREIGN PATENT DOCUMENTS

| | | |
|---|---|---|
| DE | 699 13 978 T2 | 12/2004 |
| EP | 1854542 A1 | 11/2007 |
| JP | 2002528265 A * | 9/2001 |

OTHER PUBLICATIONS

International Search Report, dated Dec. 10, 2018, issued for International Application No. PCT/EP2018/075413, 5 pages (with English translation).
(Continued)

*Primary Examiner* — Robert R Raevis
(74) *Attorney, Agent, or Firm* — Klarquist Sparkman, LLP

(57) ABSTRACT

The invention relates to a filtration device and to a method for characterizing a filter medium or a medium to be filtered. The filtration device comprises a plurality of filtration units. Each filtration unit comprises a first container, which is designed to receive a medium to be filtered, a second container, which is designed to receive a filtrate, at least one connecting line, which connects the first container to the second container, and a filter medium between the first container and the second container in order to filter the medium to be filtered. The first container is designed for the
(Continued)

Figure 1:
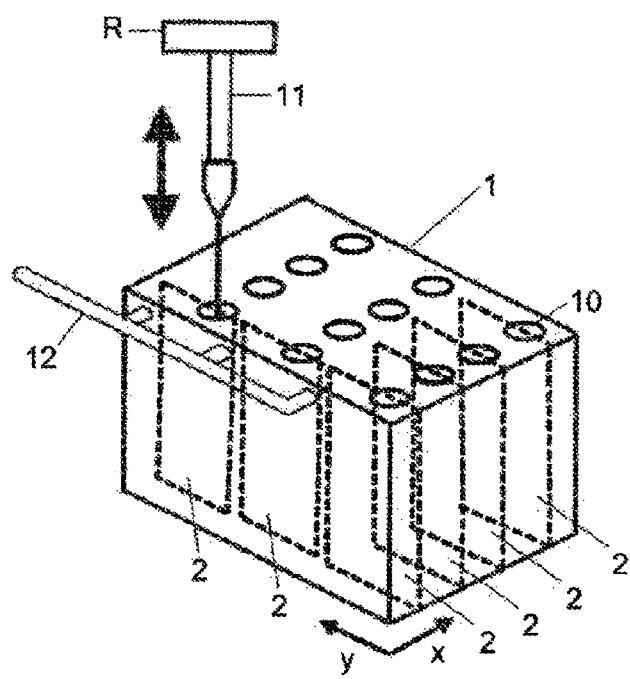

application of positive pressure thereto, and the second container is designed to receive a measurement instrument at ambient pressure.

20 Claims, 3 Drawing Sheets

(51) Int. Cl.
*B01D 46/44* (2006.01)
*B01D 46/58* (2022.01)

(52) U.S. Cl.
CPC ...... *B01D 2221/10* (2013.01); *B01D 2313/06* (2013.01); *B01D 2313/903* (2022.08); *B01L 3/50255* (2013.01); *B01L 2300/088* (2013.01); *B01L 2400/0487* (2013.01)

(58) Field of Classification Search
CPC .... B01D 2313/90; B01D 45/00; B01D 63/08; B01D 63/087; B01D 63/088; B01L 3/50255; B01L 2300/088; B01L 2400/0487; B01L 2200/146; B01L 2200/147; B01L 3/502; B01L 3/56; B01L 3/561; B01L 3/5635; B63D 63/081
USPC .. 73/37, 53.01, 64.56, 61.43, 61.56, 863.23; 422/68.1, 82, 534, 535; 324/425, 438; 210/767, 294, 295, 321.6, 321.61, 321.72, 210/321.75, 321.84, 435, 436, 443
See application file for complete search history.

(56) References Cited

OTHER PUBLICATIONS

Written Opinion, dated Dec. 10, 2018, issued for International Application No. PCT/EP2018/075413, 9 pages (with English translation).

* cited by examiner

FILTRATION DEVICE, METHOD FOR ASSEMBLING A MODULAR FILTRATION DEVICE, AND METHOD FOR CHARACTERIZING A FILTER MEDIUM AND/OR A MEDIUM TO BE FILTERED

CROSS REFERENCE TO RELATED APPLICATIONS

This is the U.S. National Stage of International Application No. PCT/EP2018/075413, filed Sep. 20, 2018, which in turn claims the benefit of German Patent Application No. 10 2017 009 147.1, filed Sep. 29, 2017. German Patent Application No. 10 2017 009 147.1 is incorporated herein by reference in its entirety.

The present invention relates to a filtration device, a method for assembling a modular filtration device, and a method for characterizing a filter medium and/or medium to be filtered. In particular, the invention relates to a device and method for the process-oriented characterization of filters and feed solutions in 'high-throughput screening' systems (HTS systems, 'multi-well' systems).

High-throughput screening (HTS) is a fully or at least partially automated method which is used in particular in pharmaceutical research and which enables a large number of parameters to be investigated in a relatively short time.

The HTS method is used, for example, in the biopharmaceutical industry for analyzing solutions using different parameters, such as pH, conductivity and/or additives, with regard to their filtration behavior with various filter media. Properties such as flow rate, blocking behavior (standard time curve), protein transmission and the composition of filtrates can thereby be measured or evaluated. In addition, influences of process parameters, such as, among other things, applied pressure, the filter types used, and the degree of loading, can be examined on a small scale and then transferred to a larger scale.

Another field of application of the HTS method lies in the development of new filter media. The filtration behavior of a multiplicity of filter media with different structures, surface properties and configurations can here be examined and evaluated in a time-efficient manner.

DE 2010 011 485 A1 describes a device which is suitable for the high-throughput screening method and which has an upper section and a lower section with a plurality of communicating holes ('wells') and a filter medium between the upper and lower sections. The holes in the upper section are filled with a medium to be filtered. By applying a negative pressure to the holes in the lower section, the medium to be filtered flows through the filter medium. The filtrate is collected in the holes in the lower section.

The application of a negative pressure to the 'wells' in the lower section can lead to an increased evaporation of solvents at the surface of the filter's underside (downstream side) that is exposed to the negative pressure, which leads to a local increase in concentration of dissolved substances in the filtration solution and to the solubility of dissolved substances being exceeded. As a result, an increased formation of deposits and an early blocking of the filter medium can occur. In addition, bubbles can form on the downstream side of the filter when the medium to be filtered contains surface-active substances, such as surfactants and proteins. Such bubble formation can induce denaturation and aggregation of proteins, which also results in the formation of deposits and early blocking of the filter media.

A further disadvantage of the device and method described in DE 10 2010 011 485 A1 is the fact that no measurement of the filtrates at the 'wells' in the lower section is possible without interrupting the filtration process.

U.S. Pat. No. 4,948,564 A describes a device having a plurality of stacked and interconnected 'wells' and a filter mat located between them. The application of a positive pressure to the upper 'wells' containing the medium to be filtered causes the medium to be pressed into the lower 'wells' through the filter mat. In this task, however, it is difficult to measure the fill levels in the 'wells' without interrupting the filtration process and to determine therefrom the flow rates during the filtration process.

Against this background, it is an object of the present invention to provide a device and a method which enable a process-oriented and highly parallelized performance of filtration operations while simultaneously measuring process parameters without interrupting the filtration together with the option of varying the filter media and raw materials.

This object is achieved by the objects of the independent claims. Preferred embodiments are the subject-matter of the dependent claims.

In particular, the invention thus provides a filtration device for characterizing filter media and/or media to be filtered. This filtration device comprises a plurality of filtration units, each filtration unit comprising a first container designed to receive a medium to be filtered, a second container designed to receive a filtrate, at least one connecting line connecting the first container to the second container, and a filter medium between the first container and the second container in order to filter the medium to be filtered. In this case, the first container is designed to be subjected to positive pressure, and the second container is designed to receive a measurement instrument at ambient pressure.

The plurality of filtration units makes possible a parallelized and thereby highly efficient characterization of different media or of media to be filtered separately. For example, the first containers of the plurality of filtration units can be filled with different solutions with different parameters (e.g., pH, conductivity and/or additives) in order to obtain measurements in particular under identical process parameters (e.g., applied pressure and/or ambient temperature).

The filtration device described offers, in particular, the possibility of performing a characterization during the filtration process without interrupting or otherwise influencing the filtration process. This is achieved by the special design of the filtration device, in particular of the second container of the plurality of filtration units: The second container of the filtration unit, which receives the filtrate, that is to say, the medium filtered by the filter medium, collects the filtrate at ambient pressure. This particular design makes it possible for a measurement instrument to be introduced into the second container, for the filtrate to be measured continuously and/or at regular time intervals, in particular virtually continuously, and for example for the fill level of the filtrate in the second container to be measurable.

Likewise, the plurality of filtration units in the filtration device advantageously enables a parallel characterization of different filter media and their effect on the filtration process of a single, specific medium or even of a plurality of different media.

For example, the filter media between the first and second containers of the filtration units can have different structures or surface properties. In addition, different types of filter media can be used which function by means of different mechanisms of action. In addition to filter media based on size exclusion (e.g., microfiltration, virus filtration and/or ultrafiltration membranes, depth filters, filters of sintered materials and/or fibers), these also include filter media based on interactions (e.g., membrane absorbers, monoliths, chromatographic gels).

In a preferred embodiment, the at least one connecting line runs in such a way that the flow direction of a medium flowing into a second container from a first container changes. Such a course of the connecting line, which connects the first container to the second container of a filtration unit, enables the first and second containers to be arranged next to one another, for example. In a specific case, the medium preferably initially flows out of the first container substantially vertically, subsequently substantially horizontally in the direction of the second container, and finally substantially vertically into the second container.

In a preferred embodiment, each filtration unit of the filtration device has an opening in a closing region or upper region through which a measurement instrument can be at least partially introduced into the second container of the filtration units and can selectively come into contact with the filtrate therein. By means of this particular design, a measurement instrument can be inserted simply and quickly into the second containers or withdrawn from them again. This enables an efficient, sequential measurement of the filtrates in a plurality of second containers in order to obtain a sufficiently high number of fill level measurements in all filtration units even with a single measurement instrument.

The measurement instrument can be, for example, a pipette tip equipped with two electrodes so as to be able to measure the conductivity of a gas or a liquid. When the pipette tip comes into contact with the filtrate in the second container, a change in the measured conductivity can be detected and the position of the pipette tip can be recorded.

In a further preferred embodiment, the filtration device is of modular design and comprises at least a first module and a second module, wherein the first module comprises the first container and the second container of a plurality of filtration units. More preferably, the second module comprises the at least one connecting line of a plurality of filtration units. Such a filtration device offers the advantage of simplified preparation and assembly of the filtration device. Here, the filter medium of a filtration unit is preferably at least partially attached between the first module and the second module of the filtration device: The first module and the second module are in contact via at least one surface in each case. These surfaces each have at least partial regions of the first and second containers or at least partial regions of the at least one connecting line of the corresponding connecting line so that the medium on its way from the first container into the second container passes or flows through the transition region between the first module and the second module, that is to say, the said contacting surfaces of the first module and of the second module.

In addition, such an advantageous design of the filtration device permits simple attachment, restocking and/or replacement of a large number of identical or different filter media: The medium to be filtered flows out of the first container located in the first module via the at least one connecting line located in the second module and into the second container, located in the first module, of the filtration device. As a result, the filter medium can be placed or arranged between the first module and the second module so that the medium to be filtered flows through the filter medium when it is transferred from the first container into the second container and is thus filtered by the filter medium.

The filter medium may comprise one or more membrane sheets, for example. In addition, the filter medium may be designed such that it is located between a plurality of first and second containers of a plurality of filtration units. In other words, a plurality of media to be filtered in a plurality of filtration units flow through the same filter medium on their way from the respective first containers into the respective second containers. This reduces the cost of preparing the filtration device since only a reduced number of filter media has to be placed or arranged.

The special design of the filtration device also allows the use of small flow-facing filter surfaces so that tests can be carried out on a very small scale. Furthermore, a medium to be filtered with which is filled into the first container comes into direct contact with the filter medium since the filter medium constitutes at least a partial region of the bottom of the first container. In this way, no dead volume arises when filling with the medium to be filtered on the upstream side of the filter medium. On the other hand, in typical small-scale filtration devices (e.g., capsules), venting is required in the case of empty filtration devices or unwanted dilution effects will occur at the beginning of filtration in the case of filtration devices filled with a buffer or water.

In a further preferred embodiment, the filtration device additionally comprises a porous carrier material which serves to provide the filter medium with mechanical support. The porous carrier material is preferably located in a region of the second module which region is located downstream of the filter medium, that is to say following its 'downstream side,' in relation to the flow direction of the medium. The porous carrier material thus supports the filter medium so that it can better withstand the forces caused by the pressurization. Consequently, the porous carrier material can be at least partially flowed through by the filtered medium, the filtrate, on its way into the second container.

In a particularly preferred embodiment of the filtration device, the first module comprises a container plate with the first container and the second container of a plurality of filtration units, as well as one or more openings, the openings being designed to apply positive pressure to the first containers and/or to allow a measurement instrument to access the second containers. Furthermore, the second module of the filtration device comprises a connecting line plate having a plurality of connecting lines, wherein at least one filter medium is at least partially attached between the container plate of the first module and the connecting line plate of the second module of the filtration device.

In this particularly preferred embodiment of the filtration device, each of the filtration units has in particular at least two types of openings: At least one opening designed to apply positive pressure to the first container and at least one opening designed to allow a measurement instrument to access the second container.

More preferably, the first module can be of modular design. In particular, such a modular first module preferably comprises a container plate with the first and second containers, as well as a cover plate with the opening(s).

The second module of the filtration device is preferably of modular design and comprises, in addition to the connecting line plate, an end plate which is in contact with the connecting line plate. The end plate can also comprise one or more segments of the connecting lines. Such an end plate serves as the base of the filtration device and can furthermore comprise holes which are designed to receive guide elements. Corresponding holes in at least a part of the individual parts of the filtration device advantageously allow the individual parts of the filtration device to be arranged in a precise fit. The guide elements can here comprise threaded rods in order to fasten the individual parts of the filtration device using nuts and press them so that a clean connection between the individual parts of the filtration device is ensured.

In a further aspect, the invention provides a method for assembling a modular filtration device with a plurality of filtration units, in particular a filtration device according to an aspect of the present invention, or an embodiment thereof. This method comprises the steps of:

attaching to a connecting line plate at least one filter medium for filtering a medium to be filtered;

arranging a container plate on the connecting line plate, the container plate comprising a plurality of first and second containers, wherein a first container and a second container are in each case associated with a filtration unit, wherein the first container of a filtration unit is designed to receive a medium to be filtered, and the second container of a filtration unit is designed to receive a filtrate, so that the at least one filter medium is located at least partially between the connecting line plate and the container plate; and the respective first and second containers of a filtration unit are connected by one or more connecting lines of the connecting plate, wherein the first container of a filtration unit is designed such that positive pressure is to be applied to it via a first opening, and wherein the second container of a filtration unit has a second opening through which a measurement instrument can be received at ambient pressure in the second container.

Due to the modularity of the filtration device, the described method enables a step-by-step assembly of the filtration device. Here, for each filtration unit, a filter medium is first attached to the connecting line plate of the filtration device so that the filter medium of a medium to be filtered is filtered thereby on its way from the first container to the second container. A filter medium can in this case also extend over a plurality of filtration units. A filter medium preferably comprises one or more membrane sheets that can be placed on the connecting line plate. In addition, a porous carrier material may be previously attached in a region of the connecting line plate in order to support the filter medium. The filter medium is preferably wetted before or after attachment. It is likewise conceivable to arrange two or more filter media within a filtration unit. After placement of the filter media, the inlet and the outlet of the filtration unit in question are preferably sealed against the other filtration units by means of customary sealing means, such as O-rings.

In a preferred embodiment of the method, a cover plate is arranged on the container plate of the modular first module, wherein the cover plate comprises the first and second openings of the plurality of filtration units.

Further preferably, the connecting lines of the connecting line plate are filled with a fluid prior to the at least one filter medium being attached to the connecting plate. Undesired effects due to air inclusions in the connecting lines are prevented by a preferably bubble-free filling of the connecting lines of the connecting line plate with a fluid, for example by pipetting.

In a preferred embodiment, the method comprises filling the first containers of a plurality of filtration units with a medium to be filtered. This is done after the container plate has been arranged on the connecting line plate. Further preferably, the second containers are filled with a small quantity of filtrate. This has the effect that, in an initial fill level measurement of the second containers, the measurement instrument does not bump against the container wall and get damaged.

Further preferably, the second module of the filtration device is of modular design so that the method comprises the attachment of an end plate as the first step. The end plate is a component of the modular second module and serves as a base for the further individual parts of the modular filtration device. Afterwards, the connecting line plate is attached to the end plate. In addition, guide elements can be attached to the end plate and can be used to finally fix and/or press the individual parts of the filtration device.

In a further aspect, the invention provides a method for characterizing a filter medium and/or medium to be filtered, comprising the steps of:

arranging on a pipetting robot a filtration device having a plurality of filtration units, a filtration unit in each case comprising:

a first container for receiving a medium to be filtered, a second container for receiving a filtrate, at least one connecting line connecting the first container to the second container, and a filter medium between the first container and the second container for filtering the medium to be filtered;

applying a positive pressure to at least a part of the first containers of a plurality of filtration units in order in each case to filter the medium to be filtered through the filter medium and transfer it into the corresponding second container;

measuring the filtrates at ambient pressure in at least a part of the second containers by means of an inserted measurement instrument preferably during the application of positive pressure to at least a part of the first containers (3).

Here, in addition to measuring the fill levels, samples of the filtrate can also be taken during the filtration process. This can be carried out, for example, by the pipetting function of a pipette tip serving as measurement instrument. The sample is transferred, for example, into a microtiter plate or another vessel so that further analytical examinations, which are automated, among other things, of the sample composition can be carried out. Furthermore, the filtrate can be collected in fractionated form by continuous sampling so that by examining the respective samples, a change in the filtrate can be determined as the process duration progresses. This includes, for example, protein transmission, which can change due to blockage of the filter medium. Breakthrough curves, such as are customary for characterizing chromatographic filter media, can likewise be determined. In order to enable the taking of representative samples, it is advantageous to homogenize the filtrate in the second container before sampling. The filtrate can be homogenized, for example, by adding and removing using the pipetting function of a pipette tip and/or by positioning the filtration device on a mechanical shaker within the robot.

In a preferred embodiment, the method comprises measuring the initial fill levels of the filtrates in at least a part of the second containers after arranging the filtration device on a pipetting robot, and before applying positive pressure to at least a part of the first containers of a plurality of filtration units.

In addition, the applied pressure can also be controlled by an electronic control or regulation unit so that specific pressure profiles can in particular be run. The filtration device is suitable for operation at a wide pressure range from about 0.01 to about 20 bar, preferably from about 0.1 to about 5 bar, more preferably from about 0.9 to about 2.1 bar.

As an alternative to compressed air, protective gases (e.g., nitrogen, noble gases) can also be used to generate a positive pressure in order to prevent a change in the media to be filtered, for example due to a oxidation.

Figure 2:
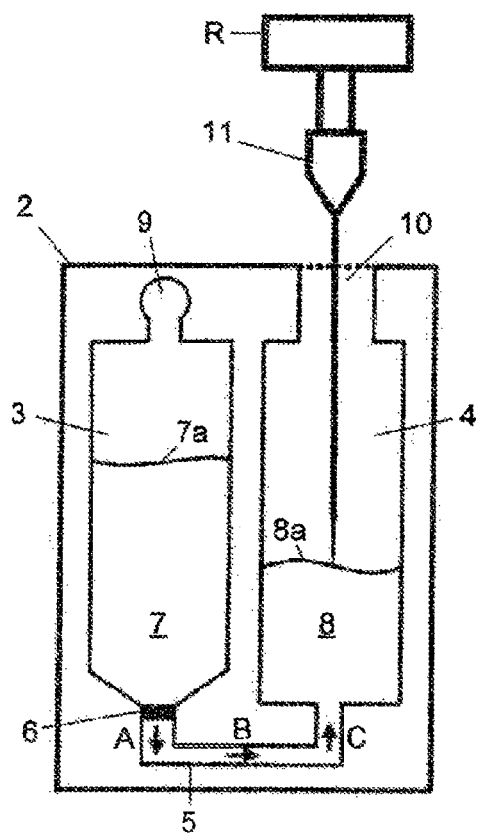
Figure 3:
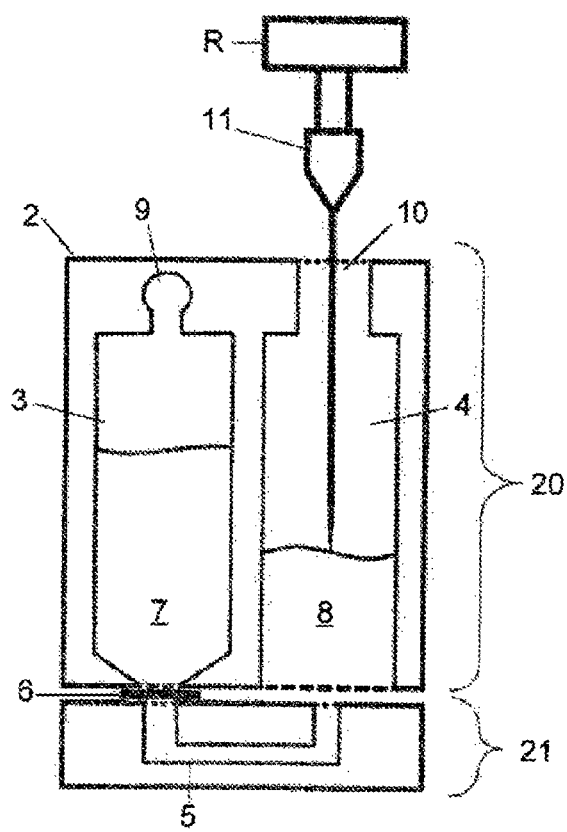
Figure 4A:
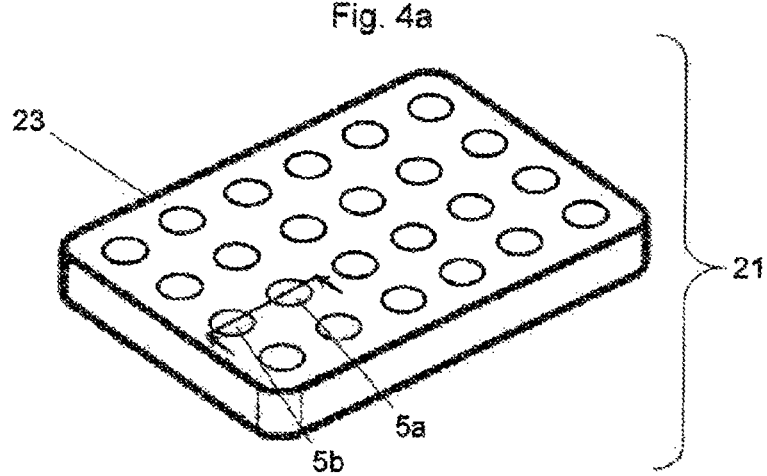
Figure 4B:
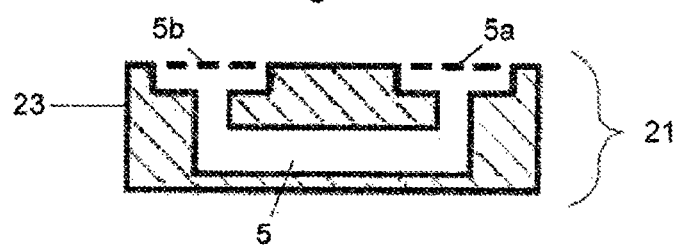
Figure 4C:
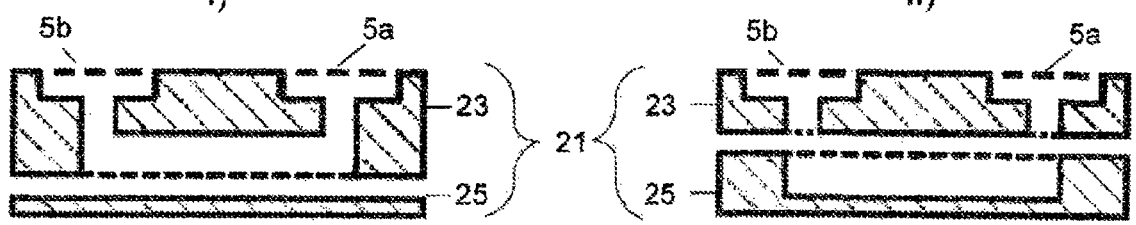
Figure 4D:
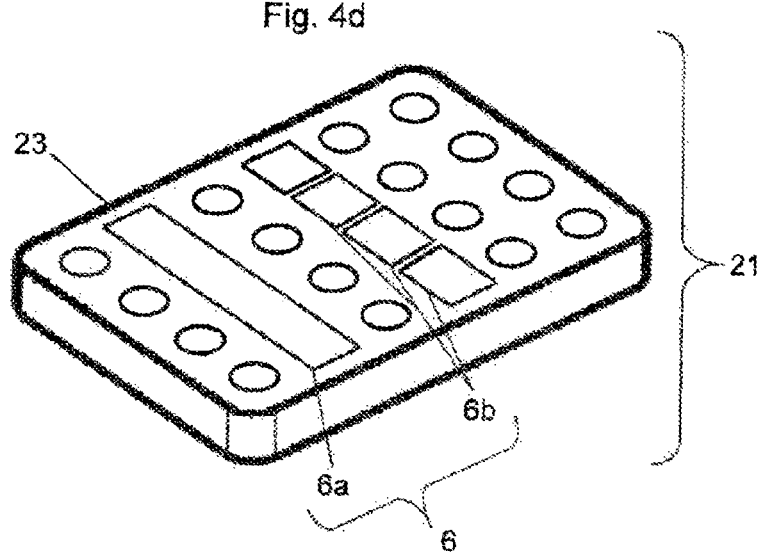
Figure 5:
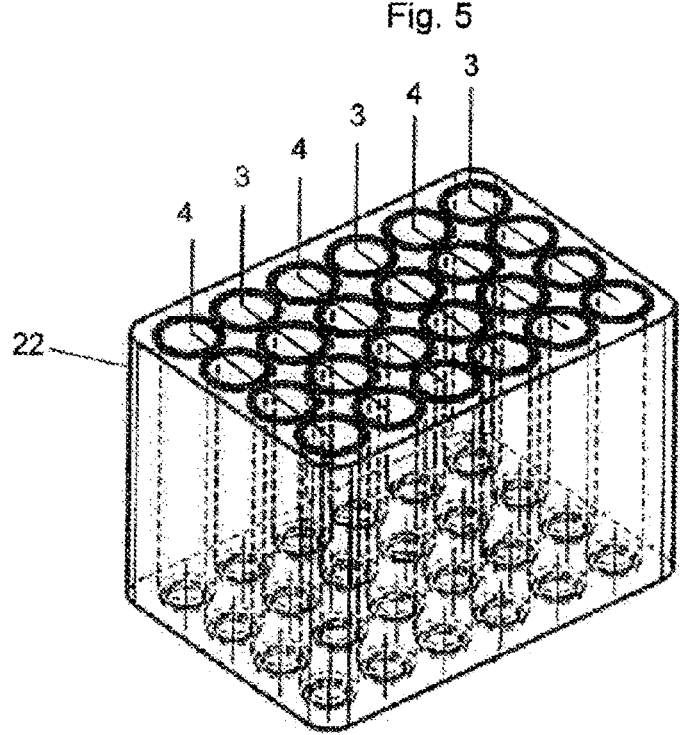
Figure 6:
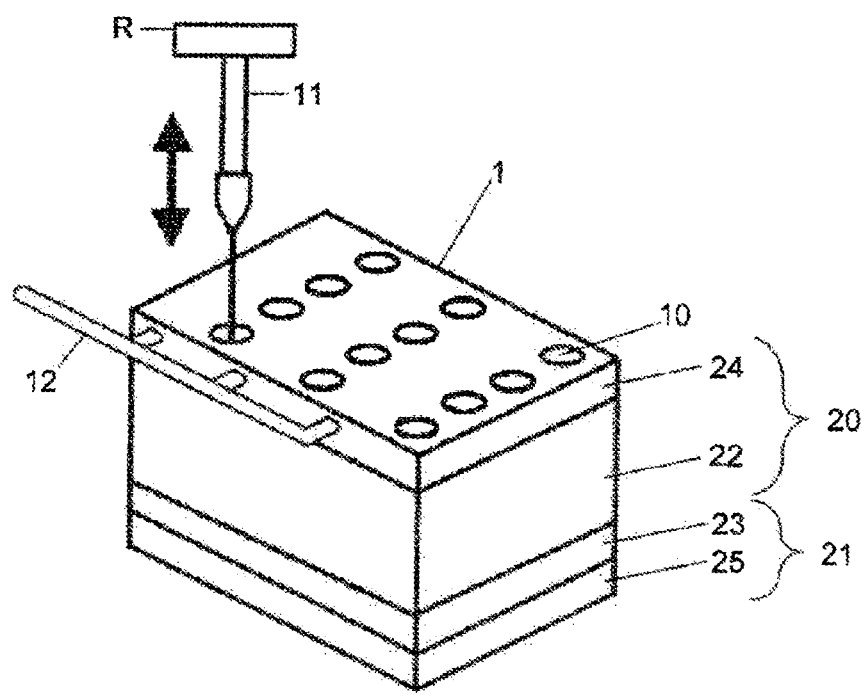

Further details in particular regarding preferred embodiments and implementations of the invention are explained by way of example below with reference to the attached drawings. They show:

FIG. 1 a filtration device according to one embodiment of the invention;

FIG. 2 a cross-section through a filtration unit of a filtration device according to one embodiment of the invention;

FIG. 3 a cross-section through a filtration unit of a modular filtration device according to one embodiment of the invention;

FIG. 4a a connecting line plate of a modular filtration device according to one embodiment of the invention;

FIG. 4b a cross-section of a part of the connecting line plate of FIG. 4a;

FIG. 4c a cross-section of preferred embodiments of the second module of the filtration device comprising a connecting line plate and an end plate;

FIG. 4d the connecting line plate of FIG. 4a with attached or arranged filter media;

FIG. 5 a container plate of a modular filtration device according to one embodiment of the invention;

FIG. 6 a modular filtration device according to a particularly preferred embodiment of the invention.

FIG. 1 shows a filtration device 1 according to one embodiment of the invention having a plurality of filtration units 2. The filtration units 2 are preferably arranged within the filtration device 1 in a grid or matrix at substantially regular intervals. In the filtration device 1 shown, the filtration units 2 are arranged in such a way that four filtration units 2 are arranged in a first direction (e.g., the x direction) and three filtration units 2 are arranged in a second direction (e.g., the y direction) running substantially perpendicularly to the first direction. The first containers 3 of the filtration units 2 are in each case connected via the first openings 9 (cf. FIG. 2) to a positive pressure line, through which they can be subjected to positive pressure. In the present example, the first containers 3 of the four filtration units 2 arranged in a first direction (e.g., the x direction) are connected to each other via the respective first openings 9. Pressurization of the respectively connected first containers 3 of the filtration units 2 takes place via the same pressurization or positive pressure line 12 so that the first containers 3 of the plurality of filtration units 2 are subjected to a substantially identical pressure. Alternatively, smaller groups of filtration units 2 can be connected to the same positive pressure line 12, for example a plurality of filtration units 2 arranged in a first direction (e.g., the x direction) and connected via their first openings 9, or each filtration unit 2 can even be connected to its own positive pressure line 12 in order to achieve or enable individual pressurization. Also conceivable is an arrangement of pressure adjustment devices (not shown) which make it possible to adjust the pressure for individual filtration units 2 or groups thereof.

The measurement instrument 11 can be received by the second containers 4 of the filtration units 2 through the second openings 10 in the upper region of the filtration device 1. In this case, the measurement instrument 11 is at least partially introduced into the second container 4 at ambient pressure or atmospheric pressure, wherein pressure equalization between external pressure and the second container 4 takes place in particular via the opening 9. In particular, one or more pipette tips, which are introduced at least partially into the second container 4 of a filtration unit through the second opening 10, are suitable as a measurement instrument 11. At or near its tip, such a pipette tip 11 has at least two electrodes in order to be able to measure the conductivity of a liquid or a gas. When the pipette tip 11 comes into contact with the filtrate 8 in the second container 4, a change in the measured conductivity is detected and the position of the pipette tip 11 is recorded. This process is repeated continuously and/or at different time intervals so that a fill level measurement (in particular a virtually continuous fill level measurement) of the filtrates 8 in the second container(s) 4 can be carried out.

In this way, each filtration unit 2 has its own data record of the fill levels so that individual analyses, for example with regard to flow rates and/or service life, can be created for each individual filtration unit 2.

FIG. 2 shows a cross-section through a filtration unit 2 of a filtration device 1 according to one embodiment of the invention. Each of the plurality of filtration units 2 of the filtration device 1 comprises a first container 3, a second container 4, at least one connecting line 5 connecting the first container to the second container, and a filter medium 6 between the first container and the second container. The first container 3 of the filtration unit 2 is designed to receive a medium 7 to be filtered and to be subjected to positive pressure, for example by a positive pressure gas being introduced via a first opening 9. The introduced positive pressure acts at the surface 7a on the medium 7 to be filtered. By the application of positive pressure to the first container 3, the medium 7 to be filtered is transferred via the at least one connecting line 5 into the second container 4. In the process, the medium 4 to be filtered passes through the filter medium 6 which is located between the first and second containers 3, 4.

The media to be filtered are in particular buffer solutions and/or protein solutions. Various filter media 6 may be used, such as microfilters, virus filters, ultrafilters and/or membrane absorbers. Single- or multi-layer filters are particularly preferably used. They can be made of different materials and/or have different thicknesses, permeability parameters and/or pore sizes. In particular, filter membranes or filter sheets can be stacked on top of each other in multiple layers (at least in some areas).

In the preferred embodiment shown in FIG. 2, the flow direction A, B, C of the medium flowing through the connecting line changes before it enters the second container 4, which is designed to receive the filtrate 8. In the present case, the first and second containers 3, 4 are arranged side by side or adjacent to each other. The filter medium 6 is located below the first container 3. This arrangement has the advantage that there is no dead volume in the second container 4 so that the entire medium 7 to be filtered can be filtered. The medium 7 to be filtered consequently initially moves substantially vertically downward out of the first container 3, passes through the filter medium 6 (arrow A) and enters the connecting line 5 as filtrate 8. Said connecting line 5 directs the filtrate 8 into the second container 4, as a result of which the flow direction of the filtrate 8 is next substantially horizontal (arrow B) before the filtrate 8 finally enters the second container 4 substantially vertically upward (arrow C) and is gradually collected there.

In the embodiment shown, a positive pressure is generated in the first container 3 of the filtration unit 2 by introducing a fluid (e.g., a gas) via a first opening 9 (in particular in or near the upper region of the filtration device 1). The positive pressure present pushes the medium 7 to be filtered through the filter medium 6 and via the connecting line 5 into the second container 4. The second container 4 collects the filtrate 8 at atmospheric pressure, i.e., atmospheric pressure prevails at the surface 8a of the filtrate 8. The second container 4 is furthermore designed to receive a measurement instrument 11, in the present example a pipette tip, via a second opening 10.

Since the second container 4 is at ambient pressure and has an opening 10, any number of measurements can be carried out during filtration without having to interrupt the filtration process or influencing it in some other way.

FIG. 3 shows a further embodiment of the invention, wherein the filtration device 1 is of modular design. The first module 20 of the filtration device 1 comprises the first and second containers 3, 4 of a plurality of filtration units 2. The second module 21 of the filtration device 1 comprises the connecting lines 5 of a plurality of filtration units 2. The filter media 6 are located between the first module 20 and the second module 21 of the filtration device 1. In this embodiment, filter membranes or filter sheets are preferably used as the filter medium 6 since they have only a small height.

The connecting lines 5, filter media 6 and first and second containers 3, 4 of each filtration unit 2 are arranged in such a way that, by bringing the contact surfaces of the first and second modules 20, 21 into contact, a substantially closed and tight fluid connection is created between the first container 3 and the second container 4.

FIG. 4a shows a connecting line plate 23 according to one embodiment of the invention. The connecting line plate 23 is part of the second module 21 of the filtration device 1. The connecting line plate 23 comprises the connecting lines 5 of a plurality of filtration units 2. The connecting line plate 23 illustrated can, for example, be produced by the laser sintering process, as a result of which even complex structures that are not accessible from the outside can be produced. FIG. 4a shows only the paired inlets and outlets of the connecting lines 5a, 5b, wherein they can have different diameters. The inlet 5a particularly preferably has a larger diameter than the connecting line 5.

FIG. 4b shows a cross-section of a partial region of the connecting line plate 23 of FIG. 4a and a connecting line 5 located therein of a filtration unit 2.

FIG. 4c shows alternative embodiments of the second module 21 of a modular filtration device 1, wherein the second module 21 is of modular design and has an end plate 25 in addition to the connecting line plate 23. This end plate 25 is located on the side of the connecting line plate 23 opposite the inlets and outlets 5a, 5b. If such an end plate 25 is present, the effort required to manufacture the connecting line plate 23 can be considerably reduced since the connecting lines 5 can be produced in the conventional method by drilling and/or milling. In this case, a part of the connecting lines 5, in particular the horizontal section, can be enclosed by the end plate so that the connecting line plate 23 only has vertical holes (FIG. 4c II).

FIG. 4d shows the connecting line plate 23 of FIG. 4a with additionally attached filter media 6. Depending on the characterization method, a filter medium 6a may extend over two or more filtration units 2 and/or each filtration unit 2 may have its own filter medium 6b. The use of one filter medium 6a for a plurality of filtration units 2 is particularly advantageous in a characterization of various media 7 to be filtered using the identical filter medium 6 since this can considerably reduce the effort involved in preparing the filtration device 1. In contrast, attaching different (individual) filter media 6b is particularly suitable for characterizing different filter media 6 in conjunction with different or even identical media 7 to be filtered and/or different applied pressures.

FIG. 5 shows a container plate 22 of the first module 20 of a filtration device 1 according to the invention with first and second containers 3, 4 of a plurality of filtration units 2. The filtration units 2 are arranged identically to the filtration device 1 shown in FIG. 1, wherein the container plate 22 has in each case three rows each with four first containers 3 and four second containers 4. The container plate 22 is arranged on the connecting line plate 23 after attaching the filter media 6. The container plate 23 shown is used in conjunction with a cover plate 24 which, after the first containers 3 of the filtration units have been filled, is arranged on the container plate and which contains the openings 9, 10 for applying positive pressure to the first containers 3 and/or allowing a measurement instrument 11 to access the second containers 4. In this preferred embodiment, it is clear that the container plate 22 can be manufactured with particularly little effort since the first and second containers 3, 4 have identical dimensions and a simple geometry.

FIG. 6 shows a particularly preferred embodiment of the modular filtration device 1 having a connecting line plate 23 and an end plate 25 as shown in FIG. 4c, a container plate 22 as shown in FIG. 5, and a cover plate 24 having the openings 9, 10 of the first and second containers 3, 4 of the filtration units 2.

The modularity of the filtration device 1 according to this preferred embodiment enables not only a low manufacturing outlay but also a particularly simple assembly of the filtration device 1 and the particularly simple way of varying the filter media 6 and/or raw materials:

Firstly, the various filter media 6 are attached to the connecting line plate 23. Optionally, the connecting lines 5 were previously filled with a fluid and/or a porous carrier material which supports the filter media 6 was attached. Next, the container plate 22 shown in FIG. 5 is arranged on the connecting line plate 23. Due to the special design of the container plate 22, all of the first and second containers 3, 4 of the plurality of filtration units 2 are accessible from above so that the first containers 3 can be filled in a simple manner with the same or with different media 7 to be filtered. Optionally, the second containers 4 are filled with small quantities of a filtrate 8 so that, in an initial fill level measurement, the measurement instrument 11 is not damaged by bumping against the container wall. Finally, the cover plate 24 is arranged on the container plate 22. The cover plate 24 has the first and second openings 9, 10. The filtration device 1 can then be arranged beneath the measurement instrument 11, wherein one or more measurement instruments 11 can be at least partially introduced into the respective second container 4 via a measuring robot R (in particular taking the form of a pipetting robot). In this case, it is advantageously possible to use a robot of the Freedom EVO® series from Tecan Trading AG, Switzerland, and/or a LISSY® model robot from Zinsser NA Inc., Northridge (Calif.), USA. In the embodiment shown, the first openings 9 are connected to a pressurization or positive pressure line 12 in order to apply positive pressure to the first containers 3 of the filtration units 2 with the aid of a positive pressure gas or fluid. The second openings 10 enable a measurement instrument 11 to be introduced into the second containers 4 at ambient pressure in order to measure fill levels in the second container 4 and optionally to take filtrate samples during the filtration process. The measuring robot R preferably controls or regulates the displacement of the measurement instrument 11 and/or its measuring processes.

LIST OF REFERENCE SIGNS

1 Filtration device
2 Filtration unit
3 First container
4 Second container
5 Connecting line
5a Inlet of connecting line
5b Outlet of connecting line
6 Filter medium
7 Medium to be filtered
8 Filtrate
9 First opening
10 Second opening
11 Measurement instrument
12 Positive pressure line
20 First module
21 Second module
22 Container plate
23 Connecting line plate
24 Cover plate
25 End plate
R Measuring robot

The invention claimed is:

1. A filtration device comprising:
a plurality of filtration units, each filtration unit comprising:
  a first container configured to receive a medium to be filtered;
  a second container configured to receive a filtrate;
  at least one connecting line connecting the first container to the second container; and
  a filter medium between the first container and the second container in order to filter the medium to be filtered,
wherein the first container is configured to be subjected to positive pressure,
wherein the second container is configured to receive a measurement instrument at ambient pressure, and
wherein the at least one connecting line comprises a fluid passageway that extends between the first and second containers, and a flow direction of the medium through the at least one connecting line changes as the medium flows from the first container to the second container.

2. The filtration device according to claim 1, wherein the flow direction of the medium through the connecting line changes from a vertical direction to a horizontal direction.

3. The filtration device according to claim 1, wherein respective first and second containers of a respective filtration unit are arranged with the first and second containers in the same horizontal plane.

4. The filtration device according to claim 1, wherein each filtration unit has an opening in its upper region, the opening being configured to receive a measurement instrument that can be introduced into the second container to contact the filtrate located therein.

5. The filtration device according to claim 1, wherein the filtration device is modular and comprises at least a first module and a second module, the first module comprising the first container and the second container of the plurality of filtration units.

6. The filtration device according to claim 5, wherein the second module comprises the at least one connecting line of the plurality of filtration units.

7. The filtration device according to claim 6, wherein the filter medium of a filtration unit is attached at least partially between the first module and the second module of the filtration device.

8. The filtration device according to claim 7, wherein the second module of the filtration device comprises a porous carrier material that supports the filter medium.

9. The filtration device according to claim 6, wherein:
the first module comprises a container plate with one or more openings configured to apply positive pressure to the first containers and/or to allow a measurement instrument to access the second containers;
the second module comprises a connecting line plate having a plurality of the at least one connecting lines; and
at least one of the filter mediums of the respective filtration units is attached between the container plate of the first module and the connecting line plate of the second module.

10. The filtration device according to claim 9, wherein the first module further comprises a cover plate with the one or more openings.

11. The filtration device according to claim 9, wherein the second module of the filtration device further comprises an end plate.

12. The filtration device according to claim 11, wherein the end plate comprises segments of the connecting lines.

13. A method for assembling a modular filtration device with a plurality of filtration units, the modular filtration device comprising a plurality of first containers and a plurality of second containers, with each of the filtration units comprising a respective one of the first container and a respective one of the second container, the method comprising the steps of:
  attaching at least one filter medium to a connecting line plate; and
  arranging a container plate on the connecting line plate, the container plate comprising the plurality of first and second containers, wherein the first container of a respective one of the plurality of filtration units is configured to receive a medium to be filtered and the second container of the respective one of the plurality of filtration units is configured to receive a filtrate,
wherein the at least one filter medium is at least partially located between the connecting line plate and the container plate, and the respective first and second containers of a respective one of the plurality of filtration units are connected by one or more connecting lines of the connecting plate,
wherein the one or more connecting lines comprise fluid passageways,
wherein the first container of a respective one of the filtration units is configured to be subjected to positive pressure through a first opening, and
wherein the second container of a respective one of the filtration units has a second opening through which a measurement instrument can be received in the second container at ambient pressure.

14. The method according to claim 13, further comprising the step of:
  arranging a cover plate on the container plate, the cover plate comprising the first and second openings of the plurality of filtration units.

15. The method according to claim 13, further comprising the step of:

filling the connecting lines of the connecting line plate with a fluid prior to the at least one filter medium being attached to the connecting plate.

16. The method according to claim 13, furthermore comprising the step of:
    filling the first containers of a plurality of filtration units with a medium to be filtered after arranging the container plate on the connecting line plate.

17. A method for characterizing a filter medium and/or a medium to be filtered, comprising the steps of:
    arranging a filtration device having a plurality of filtration units on a pipetting robot, each filtration unit respectively comprising:
        a first container configured to receive a medium to be filtered,
        a second container configured to receive a filtrate,
        at least one connecting line connecting the first container to the second container, and
        a filter medium between the first container and the second container in order to filter the medium to be filtered;
    wherein the at least one connecting line comprises a fluid passageway and a flow direction of the medium through the at least one connecting line changes as the medium flows from the first container to the second container,
    wherein the first container is configured to be subjected to positive pressure, and the second container is configured to receive a measurement instrument at ambient pressure;
    applying positive pressure to at least a part of the first containers of a plurality of filtration units in order to filter the medium to be filtered through the filter medium and transfer it into a corresponding second container; and
    measuring the filtrates at ambient pressure in at least a part of the second containers by means of an introduced measurement instrument.

18. The method of according to claim 17, wherein the measuring of the filtrates at ambient pressure occurs during the application of positive pressure to the at least a part of the first containers.

19. The method according to claim 17, wherein the measuring of the filtrates at ambient pressure in the at least a part of the second containers is carried out continuously and/or at regular time intervals by means of an introduced measurement instrument.

20. The method according to claim 17, further comprising the step of:
    measuring initial fill levels of the filtrates in the at least a part of the second containers after arrangement of the filtration device on the pipetting robot and before applying positive pressure to the at least a part of the first containers of a plurality of filtration units.

* * * * *